US008398513B2

(12) United States Patent
Simonov et al.

(10) Patent No.: US 8,398,513 B2
(45) Date of Patent: Mar. 19, 2013

(54) PLATE-LINK CHAIN, PARTICULARLY FOR A MOTOR VEHICLE DRIVE SYSTEM

(75) Inventors: Anton Simonov, Bühl (DE); Martin Vornehm, Bühl (DE); Andreas Triller, Bühl (DE); Marcus Junig, Bühlertal (DE); Olga Ispolatova, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1287 days.

(21) Appl. No.: 11/291,516

(22) Filed: Dec. 1, 2005

(65) Prior Publication Data

US 2007/0238564 A1   Oct. 11, 2007

Related U.S. Application Data

(60) Provisional application No. 60/674,824, filed on Apr. 26, 2005, provisional application No. 60/719,955, filed on Sep. 24, 2005, provisional application No. 60/737,831, filed on Nov. 17, 2005.

(30) Foreign Application Priority Data

Dec. 2, 2004 (DE) .......................... 10 2004 058 308
Sep. 23, 2005 (DE) .......................... 10 2005 045 631

(51) Int. Cl.
*F16G 13/06* (2006.01)

(52) U.S. Cl. ........................................ 474/245; 474/217

(58) Field of Classification Search .................. 474/215, 474/424, 244–245, 206, 210, 217
See application file for complete search history.

(56) References Cited

U.S. PATENT DOCUMENTS

| 4,507,106 | A | | 3/1985 | Cole, Jr. .................... 474/215 |
| 4,708,701 | A | * | 11/1987 | Cole, Jr. .................... 474/245 |
| 4,906,224 | A | | 3/1990 | Reber ........................ 474/213 |
| 5,236,399 | A | * | 8/1993 | Sugimoto et al. .......... 474/215 |
| 5,242,334 | A | * | 9/1993 | Sugimoto et al. .......... 474/215 |
| 5,423,714 | A | * | 6/1995 | Lach ............................ 451/57 |
| 5,423,724 | A | * | 6/1995 | Cole et al. .................. 474/229 |
| 6,277,046 | B1 | * | 8/2001 | Ohara et al. ................ 474/217 |
| 6,494,800 | B1 | * | 12/2002 | Kanehira et al. ........... 474/215 |
| 7,055,678 | B2 | * | 6/2006 | Gundlach et al. .......... 198/851 |

* cited by examiner

*Primary Examiner* — Robert A Siconolfi
*Assistant Examiner* — Anna Momper
(74) *Attorney, Agent, or Firm* — Alfred J. Mangels

(57) ABSTRACT

A plate-link chain for a motor vehicle drive system. The chain includes a plurality of link plates articulatingly connected with each other by rocker members. The rocker members extend transversely to the longitudinal direction of the plate-link chain. The chain includes curved contact surfaces formed on the rocker members and on the link plates, along which the rocker members and link plates are in contact with each other to transmit force. The respective contact surfaces have a width that extends transversely to the longitudinal direction of the plate-link chain, and when considered in a side view running transversely to the width and in the longitudinal direction of the plate-link chain, they have an arc length. The contact surfaces have at least three regions along the arc length with different curvatures.

9 Claims, 4 Drawing Sheets

PLATE-LINK CHAIN, PARTICULARLY FOR A MOTOR VEHICLE DRIVE SYSTEM

CROSS-REFERENCE TO RELATED APPLICATIONS

This application claims the benefit of each of the following U.S. Provisional Applications: Ser. No. 60/674,824, filed on Apr. 26, 2005; Ser. No. 60/719,955, filed on Sep. 24, 2005; and Ser. No. 60/737,831, filed on Nov. 17, 2005.

BACKGROUND OF THE INVENTION

Field of the Invention

The present invention relates to a plate-link chain, particularly for a motor vehicle transmission, a motor vehicle power train, or a motor vehicle engine auxiliary drive. The chain includes a large number of link plates that are connected by rocker members to allow relative pivotal movement of successive chain links. The rocker members extend transversely to the longitudinal direction of the plate-link chain and there are curved contact surfaces formed on the rocker members and the link plates, along which the rocker members and link plates are in contact with each other to transmit force. The respective contact surfaces have a width that extends transversely to the longitudinal direction of the plate-link chain, and when considered in a side view transverse to the width and in the longitudinal direction of the plate-link chain, the contact surfaces have an arc length.

There are various forms of plate-link chains of the type described here, depending on their use in the vehicle drive system. When used in a continuous conical disk chain variator (CVT) as part of the vehicle transmission, the rocker members have specially shaped end faces by which the pulling force between the pulleys and the chain is transmitted as frictional force. In most other applications in a vehicle drive system the plate-link chain is a toothed chain, i.e., on at least one side the link plates have teeth by which the pulling force is transmitted between toothed wheels and the chain. Toothed chains of that sort have become known in the art, for example through U.S. Pat. No. 4,906,224. Such toothed chains are employed at a plurality of locations in the vehicle drive system, for example in all-wheel transfer cases, in front transverse transmissions to bridge the center-to-center distance from the differential, as drive chains of a hydraulic auxiliary unit within the transmission, as the valve gear timing chain of an internal combustion engine, or also as drive chains for other auxiliary equipment of the motor vehicle (coolant pump, lubricant pump, air conditioning compressor, generator, starter motor, hybrid supplemental engine, brake booster, and the like).

A plate-link chain of the type described herein is made up of a multitude of link plates that are connected by rocker members to allow relative pivotal movement of successive chain links. The link plates can be arranged in the form of plate-link sets, which arise from a plurality of link plates adjoining and contiguous with each other that are interspersed with the rocker members, so that the result is a plate-link chain that is able to transmit large forces when under tension.

The transmission of force between the rocker members and the link plates takes place at contact surfaces that are formed on both the rocker members and the link plates, and along which the rocker members and the link plates are in contact with each other. The rocker members are also referred to as bolts or pins, which are placed in pairs as rocker hinges in two openings in the plate, which have often grown together into one large opening in the case of chains for belt-driven conical-pulley transmissions.

Various functional surfaces are formed on the rocker members. The pair of rocker members positioned opposite each other at an opening of the plate-link chain are in contact with each other at the rolling region or rolling surface. When the chain bends, a relative rolling motion occurs at that location on the basis of the angle of bend dictated by the geometry of the rocker members.

The contact surfaces of the rocker members are in contact with contact surfaces of the link plates, so that surface pressures exist between the contact surfaces of the link plates and the contact surfaces of the rocker members. Those contact surfaces must fulfill multiple requirements. First, the surface pressures that exist should not become too large as a result of the shape of the contact surfaces, and, second, the contact surfaces should also function as anti-rotation protection, so that the rocker members do not turn in the openings of the link plates.

For that purpose, plate-link chains that have segmented contact surfaces with two distinctly different radii per segment are known. For example, U.S. Pat. No. 6,277,046 shows a plate-link chain having two contact surfaces with two different radii on the rocker member. Through those different radii anti-rotation protection is achieved, so that the rocker members do not turn in the openings of the link plates. Another known plate-link chain is described in U.S. Pat. No. 5,236,399, which implements anti-rotation protection through the fact that, again, two different radii are provided on the contact surfaces, or the centers of the radii are offset.

In addition to the anti-rotation protection, the contact surfaces must also satisfy the requirement of a tear-proof and durable plate-link chain. For that purpose, the surface pressures in the contact zone between the rocker members and the link plates must not exceed prescribed values. In accordance with previous knowledge, contact surfaces with little curvature, and hence a large radius of curvature, were necessary. In accordance with the known plate-link chains described above, an increase of the radius of curvature is therefore necessary in order to achieve a reduction of the contact pressure at the contact surfaces.

Surprisingly, it has now become evident that the responsibility for the occurrence of compressive stress spikes in the contact region of the contact surfaces of the rocker members and the plate-link chain does not rest with the existence of a small radius of curvature (and hence a great curvature), but rather local stress spikes occur more frequently in the transition region between different radii of curvature. That leads to the recognition that in the known plate-link chains distinct stress spikes are present in the transition region from one radius of curvature to another radius of curvature, even when that transition runs tangentially, i.e., without a sharp break.

A corresponding illustration is shown in FIG. 1 of the drawings. It shows that a compressive stress spike occurs in the transition region between the small radius of curvature designated by K and the large radius of curvature designated by G, but that the compressive stresses are not significantly greater in the region of the small radius of curvature than in the region of the large radius. The perception is thus that the small radius of curvature is not responsible for the occurrence of locally higher compressive stress spikes, but that the transition region from one radius of curvature to another radius of curvature represents a disturbance point.

That is evident from the fact that although the bearing surfaces on the rocker members are provided for rotation when the plate-link chain bends, rotation of the rocker members occurs at their contact surfaces, so that even in the case of plate-link chains with anti-rotation protection relative rotation of the rocker members occurs in the contact surface region of the link plates of the plate-link chain and of the rocker members. Consequently, a shearing movement occurs between the rocker member and the link plate at the contact surfaces, which results in a mismatch of the contact surfaces at the transitions from one radius of curvature to a different radius of curvature; thus, the curvature of the link plate surface no longer matches the curvature of the rocker member surface.

That shearing movement results in a transition from surface support in the contact zone between the rocker member and the link plate, to a linear support, over the width of the rocker member, and hence to an increased contact pressure in that contact zone, so that the result is the contact pressure maximum shown in FIG. 1 of the drawings. That condition has not been taken fully into account heretofore, since in accordance with the conventional understanding attention has been directed only to a greatest possible radius of curvature to reduce the loads in the contact surface region between the rocker members and the link plates.

Hence there is a conflict of goals, to the effect that in the contact surface region on the one hand attention must be paid to the requirements of permissible surface pressures, and on the other hand a rotation of the rocker members relative to the link plates must be counteracted. An object of the present invention is to provide a plate-link chain for a motor vehicle drive, in particular as a CVT chain or toothed chain, which solves that conflict of goals.

SUMMARY OF THE INVENTION

To achieve that object, the invention provides a plate-link chain for a motor vehicle drive. The chain has a large number of link plates connected by rocker members to allow relative pivotal movement of successive chain links, wherein the rocker members extend transversely to the longitudinal direction of the plate-link chain and there are respective curved contact surfaces formed on the rocker members and the link plates, along which the rocker members and link plates are in contact with each other to transmit force. The respective contact surfaces have a width that extends transversely to the longitudinal direction of the plate-link chain, and considered in a side view transverse to the width and in the longitudinal direction of the plate-link chain, they have an arc length. The contact surface has along the arc length at least three regions with different curvatures.

In other words, the invention thereby provides a plate-link chain that has contact surfaces along its curved length which, considered in a side view along the longitudinal direction of the plate-link chain, have at least three regions with different curvature, So that large step changes in the curvature are prevented, but nevertheless regions with small and large radii of curvature are provided in order to counter rotation of the rocker members relative to the link plates.

Thus, the invention makes use of the recognition that, in contrast to the known perceptions, it is not important to provide the smallest possible curvatures with large radii of curvature in the contact surface region, but that there be provided a sufficient number of different curvatures of the contact surface of the rocker members and the contact surface of the link plates, so that step changes in curvature that result in high stress spikes are avoided.

In accordance with an advantageous refinement of the present invention, provision is made so that the ratio of the greatest curvature to the smallest curvature is a factor of at least two. That design achieves the result that there is sufficient protection against rotation of the rocker members relative to the link plates, and together with the feature that the contact surface is provided with at least three different curvatures along its arc length or curve length, that there are also sufficiently small step changes in curvature present so that unacceptably high compressive stresses do not occur at the contact surfaces in the region of the step changes in curvature.

It is also provided in accordance with the present invention, that the curvatures in the at least three regions can remain constant within the individual regions along the arc length, i.e., so that the curve length or arc length can be composed of at least three circular-arc segments, regarded in a side view along the axial longitudinal direction of the plate-link chain. As a result, the step changes between the different curvatures of the arc segments are small, and regarded in terms of radius of curvature for rocker members of a plate-link chain for a motor vehicle drive system, step changes of the individual radii of curvature for example first from 1 mm to 3 mm and then to 5 mm can occur, compared to a large step change in radius directly from 1 mm to 5 mm.

It is also provided, in accordance with the present invention, that the curvatures in the at least three regions each change within the individual regions along the arc length. In other words, that means that constant curvatures are not provided in the three different regions, but that the curvatures can change continuously within the individual regions, for example. That also makes contact surfaces possible which, regarded in an axial, longitudinal side view of the plate-link chain, are made up of spiral segments, whose curvature, and hence also their radius of curvature, changes continuously along the arc length. In addition to those spiral segments, contact surface forms are also possible which, regarded in the axial, longitudinal side view, are made up of elliptically-shaped segments whose curvature varies continuously between a minimum value and a maximum value. Also possible as segments of the curve length, in addition to those shapes, are sections of hyperbolas or parabolas, or, quite generally, contact surfaces that have curve segments along the arc length whose second derivative is constant.

According to an improvement in accordance with the present invention, it is further provided that the contact surface has curved segments along the arc length, whose smallest radius of curvature along the arc length is located substantially in the middle of the arc length.

By having the smallest radius of curvature located substantially in the middle of the arc length, the greatest curvature falls outside of the respective end region of the contact surfaces. That achieves the result that the rocker members become stiffer when compared with an arrangement wherein the smallest radius of curvature is in the region of the respective ends of the contact surfaces, and hence they bend less. With the rocker members bending less, the pulling force is distributed more uniformly over all of the adjacent link plates, and the link plates achieve greater endurance strength, and the plate-link chain as a whole is able to transmit a greater pulling force.

With a plate-link chain in accordance with the present invention, it is also achieved that no pronounced step changes in contact stress occur in the transition region between different radii of curvature of the contact surfaces. The protection against rotation of the rocker members in the openings of the link plates is also increased in comparison with known plate-link chains.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

As already explained earlier, FIG. 1 shows the surface pressure pattern at the contact pressure region between a rocker member 2 and a link plate 4 of a known plate-link chain. In the transition region between the small radius of curvature designated by K and the large radius of curvature designated by G, a pronounced maximum of the contact pressure between the rocker member and the link plate occurs, the cause of which is the step change in the radius of curvature between the small radius of curvature K and the large radius of curvature G.

Figure 1:
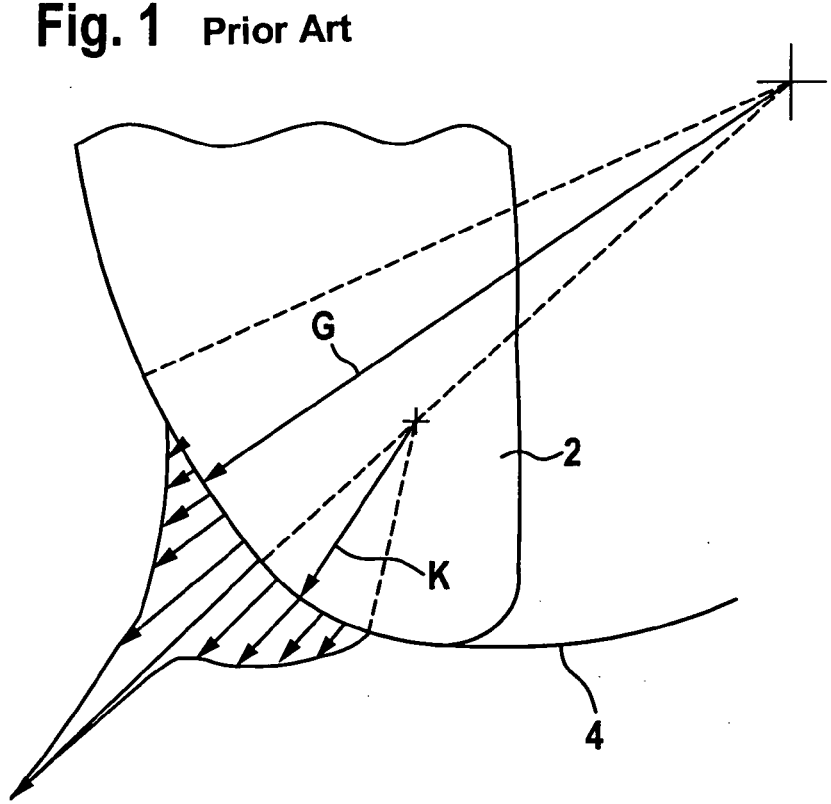
FIG. 1 is a fragmentary end view showing the surface pressure pattern at the contact surface region of the contact surfaces of a known rocker member and link plate having two significantly different radii of curvature.
Figure 2:
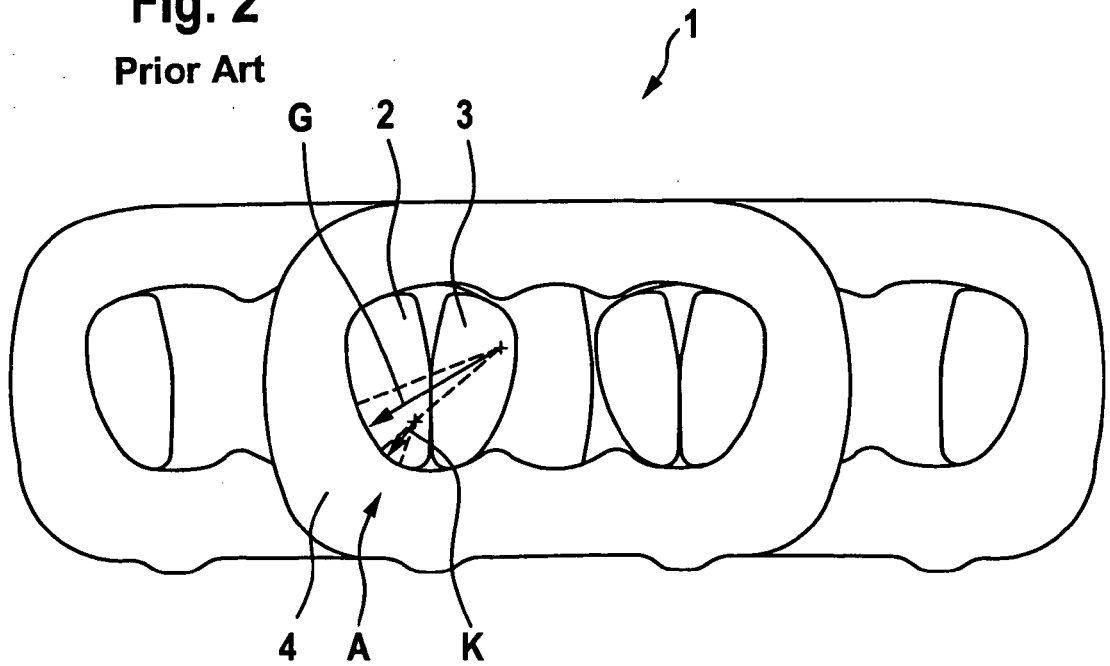
FIG. 2 is a side view of a known plate-link chain for use in a CVT transmission, where FIG. 1 of the drawing shows an enlargement of the region designated as A.

FIG. 2 shows a side view of a known CVT plate-link chain 1 that is made up of a large number of rocker members 2, 3 and link plates 4. The region designated as A in FIG. 2 is shown in FIG. 1 in enlarged form, which shows the contact pressure pattern at the contact region of rocker member 2 and link plate 4.

Figure 3:
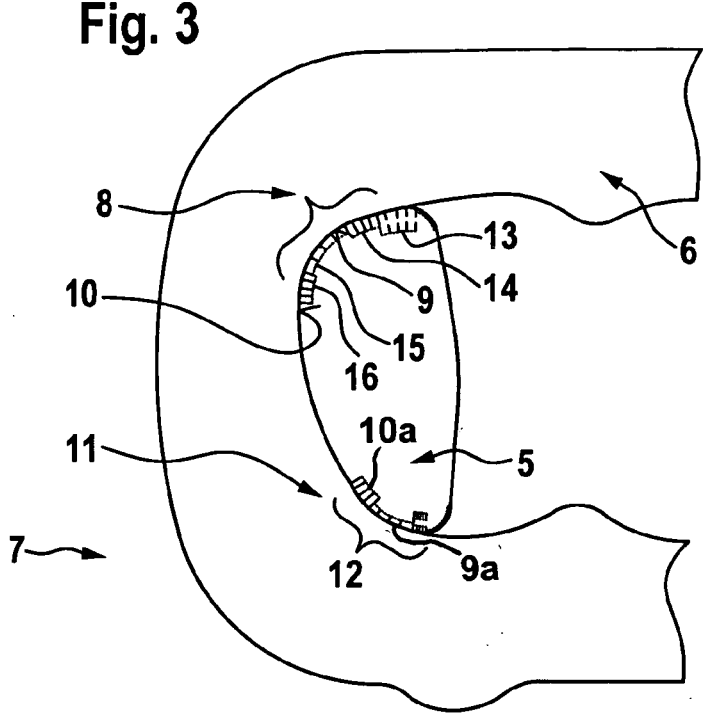
FIG. 3 is an enlarged side view of a link plate and a rocker member in a first embodiment in accordance with the present invention.

FIG. 3 shows an enlarged end view of a rocker member 5 and a portion of an adjacent link plate 6 of a plate-link chain 7 in a first embodiment in accordance with the present invention.

As can be clearly seen in FIG. 3, there are two contact surface regions 8 and 12 between rocker member 5 and link plate 6, contact surface region 8 being formed by a contact surface 9 on rocker member 5 and a complementary contact surface 10 on link plate 6. In a similar manner, contact surface region 12 is defined by a contact surface 9a on rocker member 5 and a contact surface 10a on link plate 6.

Rocker member 5 and link plate 6 are in contact at contact surface 9 and at contact surface 10 to transmit force. Since link plate 6 has a certain width or thickness in the direction perpendicular to the drawing plane of FIG. 3, and a plurality of those link plates lying side by side are in contact with the same rocker member 5, the pulling force transmitted by plate-link chain 7 is distributed over the individual contact surface regions between the rocker members and the link plates. In an axial longitudinal section of plate-link chain 7, each contact surface 9, 10 has an arc length or a curve length that is indicated in the drawing by bracket 8.

FIG. 3 shows a first embodiment of a plate-link chain in accordance with the present invention, in which contact surface 9 on rocker member 5, and complementary to it, contact surface 10 on link plate 6, have been formed with regions having different curvatures. To show those curvatures graphically, in FIG. 3 of the drawing the regions with different curvatures are shown with dashed lines of correspondingly differing radii of curvature 13, 14, 15, 16, the respective radii of curvature 13, 14, 15, 16 being drawn perpendicularly to the regions having different curvatures, in order to be able to show graphically the different curvatures at the contact surfaces 9, 10.

FIG. 3 makes it very clear that the curvature in the region of radius of curvature 13 is smaller than in the region of radius of curvature 14, so that the radius of curvature in region 13 is greater than that in region 14. In the same way, the radius of curvature in region 15 is even smaller than in region 14, and accordingly the curvature in region 15 is greater than that in region 14. Thus contact surface 9 of rocker member 5, and complementary thereto contact surface 10 of link plate 6 at contact surface region 8, already has three different curvatures along the arc length or curve length of contact surfaces 9, 10. In addition, FIG. 3 also shows that yet another fourth region having a radius of curvature 16 that differs from the radii of curvature at regions 13, 14, 15, is formed at contact surfaces 9, 10 along the arc length. In the same way, contact surface region 12 also has contact surfaces 9a and 10a having different curvatures, there being only three regions having different curvatures provided there.

Figure 4:
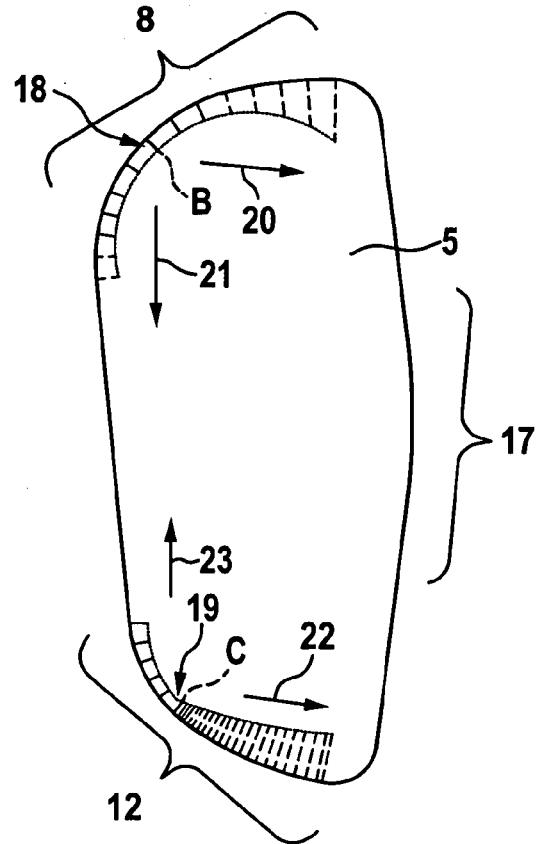
FIG. 4 is an enlarged end view of a rocker member in a second embodiment in accordance with the present invention.

FIG. 4 shows an end view of a rocker member 5 of a plate-link chain in a second embodiment in accordance with the present invention; that rocker member for its part is a rocker member of a plate-link chain for a belt-driven conical-pulley transmission.

On rocker member 5 shown in FIG. 4, reference numeral 17 designates the rolling surface with which rocker member 5 rolls against the opposing rocker member (again a pair of rocker members is involved), the basic arrangement of the rocker members in a chain being visible in FIG. 2 of the drawing. Rocker member 5, in turn, has two contact surfaces 18, 19, which are positioned at complementarily-formed contact surfaces of a link plate (not shown). The upper contact surface 18 has a point designated as B at which the maximum curvature is located, i.e., where the radius of curvature, which is again shown perpendicular to contact surface 18 by way of explanation, is at its minimum. Starting at point B the radius of curvature increases in both directions from point B, so that the curvature becomes continuously smaller at the contact surface 18 in both directions starting from point B. Starting at point B, the radius of curvature increases in the direction of arrow 20 corresponding to segments of ellipses, and in the direction of arrow 21 corresponding to segments of a spiral.

FIG. 4 shows a similar maximum curvature condition at the lower contact surface 19 starting at point C, where the radius of curvature increases in the direction of arrow 22 corresponding to a hyperbolic segment, and in the direction of arrow 23 in accordance with a segment of one arm of a parabola.

Figure 5:
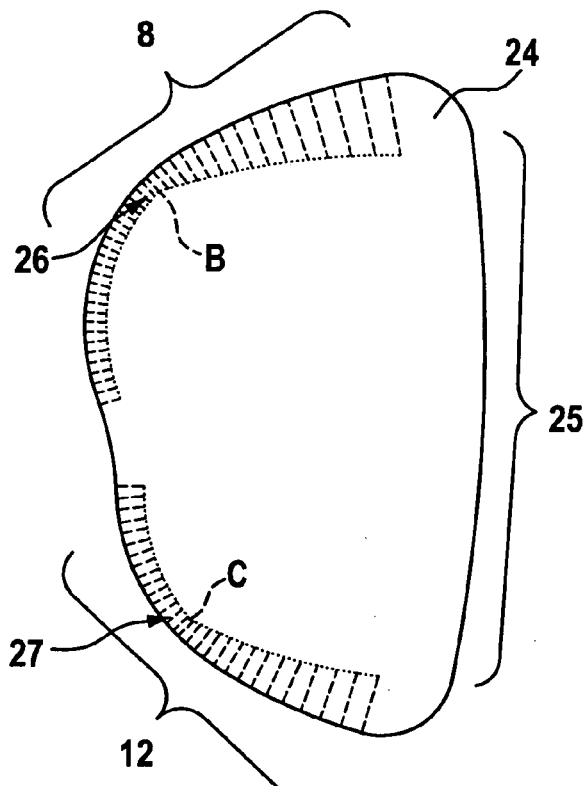
FIG. 5 is an enlarged end view of a rocker member in a third embodiment in accordance with the present invention.

FIG. 5 shows a view similar to that of FIG. 4, where the rocker member 24 of FIG. 5 is a rocker member of a toothed chain that can be employed, for example, as a toothed chain for a drive or as a toothed chain in conveyors. Rocker member 24 also has a rolling surface 25, on which it can roll against the associated rocker member of the pair of rocker members. Rocker member 24 also has an upper contact surface 26 and a lower contact surface 27. The configuration of upper contact surface 26 is chosen so that starting from point B the radius of curvature (the radius of curvature is again shown with dashed lines perpendicular to the contour of the contact surface) increases in both directions of upper contact surface 26 along the arc length, which is again shown by bracket 8. In the same way, the radius of curvature at the lower contact surface 27 increases in both directions from the maximum curvature point designated as C, corresponding to a minimum radius of curvature.

As has been further recognized, a more rigid design of the rocker members from a compression standpoint is possible if the highest curvature, and hence the minimum radius of curvature, of the contact surface is approximately in the middle of the contact surface, regarded over the arc length or curve length of the contact surface.

Figure 6:
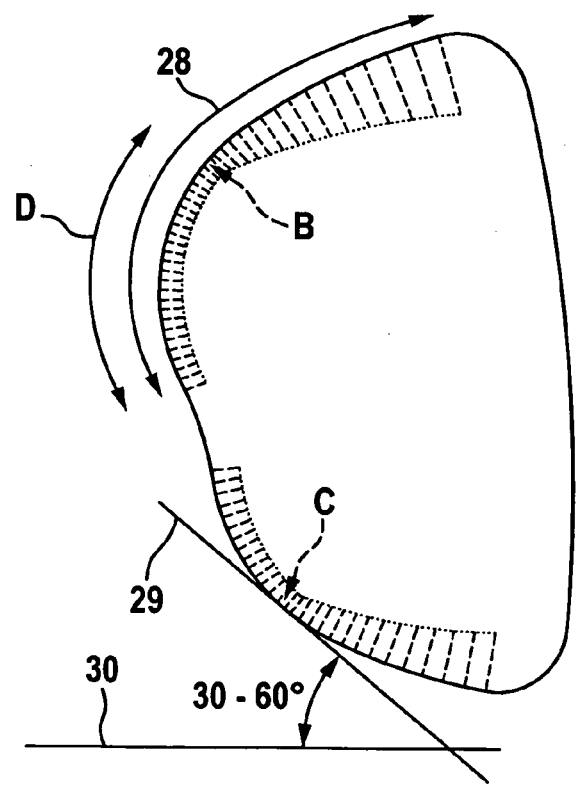
FIG. 6 is an enlarged end view of a rocker member to explain individual designations

FIG. 6 of the drawing serves to explain that relationship. The letters B and C are used again to designate the points at the upper contact surface and at the lower contact surface, respectively, that have the maximum curvature, and hence the minimum radius of curvature, within the respective contact surfaces. As can be seen clearly on the basis of the drawing, point B is located approximately in the middle of arc length 28, beneath which the region with the dashed radii of curvature also extends. Point C is similarly located relative to the arc length at the lower contact surface. Although it was mentioned above that the point having the maximum curvature along the arc length is located approximately in the middle of the contact surface (measured over the arc length 28), similarly beneficial results can be achieved when point B in region D is within the range of from 40% to 60% of the length of arc 28 of the upper contact surface for point B, as well as of the corresponding length of arc of the lower contact surface for point C. That arc length range matches an angular range of 30 degrees to 60 degrees of the tangent to the lower contact surface of the rocker member at point C, the angle of 30 degrees to 60 degrees being measured between the tangent 29 and the direction 30 in which the chain runs. If the point of the particular contact surface with the maximum curvature is located within 40% to 60% of the total arc length 28, or within 30 degrees to 60 degrees of the tangent 29 to the running direction 30 of the chain, the result is stiff rocker members that are hence less susceptible to bending, which, in turn, results in an increase in the pulling force that can be transmitted by the plate-link chain or the toothed chain.

Figure 7:
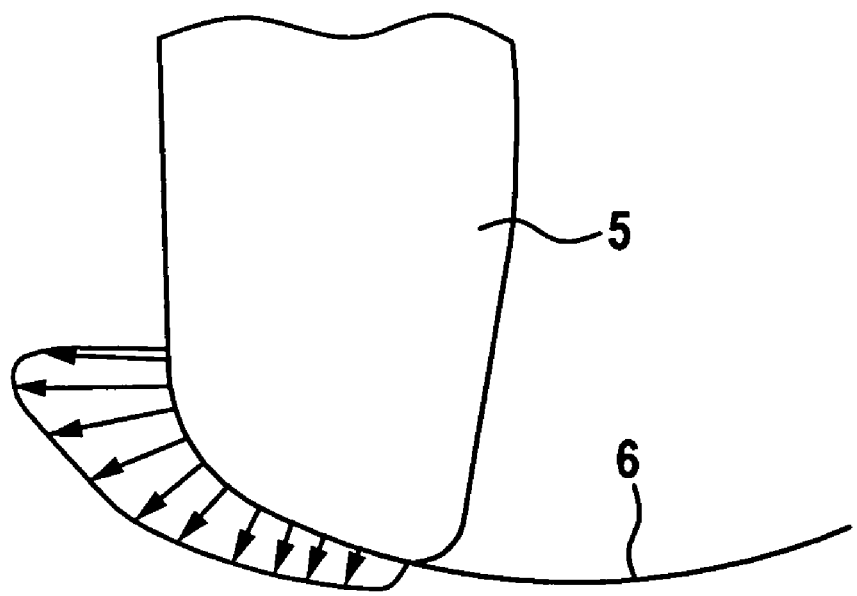
FIG. 7 is a fragmentary end view similar to FIG. 1 showing the surface pressure pattern at the contact surface region between a rocker member and a link plate of a plate-link chain in accordance with the present invention.

FIG. 7 shows another contact pressure pattern at the lower contact surface between rocker member 5 and link plate 6 of a plate-link chain designed in accordance with the invention (where the term plate-link chain, in accordance with the terminology of the invention, also includes the toothed chain). From a comparison between the contact pressure pattern of a known plate-link chain in accordance with FIG. 1 and the contact pressure pattern in accordance with FIG. 7 of the plate-link chain in accordance with the invention, it is immediately clear that the pronounced contact pressure maximum shown in FIG. 1 has disappeared. To show the contact pressure pattern on the contact surface, in both drawings a representation standardized to each other was chosen, so that the lengths of the respective arrows also represent the magnitude of the contact pressure at the particular point on the contact surface being considered. Thus, it can be seen on the basis of a visual review that the pronounced contact pressure maximum shown in FIG. 1 has disappeared, and thus the plate-link chain in accordance with the invention fulfills the object set at the beginning.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A plate-link chain for a motor vehicle drive system, the chain including a large number of link plates connected by rocker members to allow relative pivotal movement of successive chain links, wherein the rocker members extend transversely to the longitudinal direction of the plate-link chain, said chain comprising: a plurality of link plates interconnected by rocker members, wherein pairs of rocker members are positioned opposite each other and pairs of rocker members are received in respective rocker-member-receiving openings in the link plates, the pairs of rocker members each including two rocker members in surface-to-surface contact with each other at respective rocker member rolling surfaces to roll relative to each other as the chain bends, curved contact surfaces formed on the rocker members and on surfaces of rocker-member-receiving openings in the link plates, over which contact surfaces respective rocker members and link plates are in contact with each other to transmit force when the chain is pulled and wherein the rocker members are pivotable about their respective longitudinal axes and the curved contact surfaces formed on the rocker members are slidable relative to contacting rocker-member-receiving openings in the link plates when the chain bends, the respective contact surfaces each being arc-shaped and having a width that extends transversely to the longitudinal direction of the plate-link chain and having at least three sequentially-arranged arc-shaped regions with different curvatures along respective arc lengths of the regions, wherein the at least three regions include convexly-curved contact surfaces on the rocker members and concavely-curved contact surfaces on the rocker-member-receiving openings in the link plates, wherein pairs of the curved contact surfaces are provided at spaced surface contact regions on the rocker members and on the link plates and lie on respective opposite sides of a longitudinal axis of the chain, and wherein at least one contact surface region has a curved segment along the contact surface arc length whose smallest radius of curvature is located substantially in the middle of the contact surface arc length, and wherein pivotal movement of the rocker members within the link plate openings is resisted and local stress spikes are avoided at transition regions from one radius of curvature to another radius of curvature in the contact regions of the contact surfaces of the rocker members that are in contact with and are opposite to the contact regions of the link plate openings and resulting from relative pivotal movement of the rocker members relative to the rocker-member-receiving openings in the link plates.

2. A plate-link chain in accordance with claim 1, wherein a ratio of a radius of a greatest curvature region to that of a least curvature region is at least two.

3. A plate-link chain in accordance with claim 1, wherein radii of curvature in the at least three regions are each constant within each of the respective individual regions along the contact surface arc length.

4. A plate-link chain in accordance with claim 1, wherein pairs of the curved contact surfaces are provided at spaced surface contact regions on the rocker members and on the link plates and lie on respective opposite sides of a longitudinal axis of the chain, and wherein radii of curvature in the at least three regions each change within respective individual regions along the contact surface arc length.

5. A plate-link chain in accordance with claim 1, wherein at least one contact surface has a curved segment along the contact surface arc length whose second derivative is a constant.

6. A plate-link chain in accordance with claim 1, wherein at least one contact surface region has a curved segment along the contact surface arc length whose curvature is a circular arc.

7. A plate-link chain in accordance with claim 1, wherein at least one contact surface region has a curved segment along the contact surface arc length whose curvature is an elliptical arc.

8. A plate-link chain in accordance with claim 1, wherein at least one contact surface region has a curved segment along the contact surface arc length whose curvature is a parabolic arc.

9. A plate-link chain in accordance with claim 1, wherein at least one contact surface region has a curved segment along the contact surface arc length whose curvature is a hyperbolic arc.

\* \* \* \* \*